D. S. ENGLAND.
RESILIENT WHEEL.
APPLICATION FILED JUNE 19, 1920.

1,430,961.

Patented Oct. 3, 1922.

INVENTOR
D. S. England
BY
Adam E. Fisher
ATTORNEY

Patented Oct. 3, 1922.

1,430,961

UNITED STATES PATENT OFFICE.

DAVID SCOTT ENGLAND, OF SPARTA, TENNESSEE.

RESILIENT WHEEL.

Application filed June 19, 1920. Serial No. 390,176.

To all whom it may concern:

Be it known that I, DAVID S. ENGLAND, a citizen of the United States, residing at the city of Sparta and State of Tennessee, have invented new and useful Improvements in Resilient Wheels, of which the following is a specification, reference being had to the accompanying drawings.

The present invention pertains to resilient wheels, or to resilient treads therefor, especially adapted for use upon automobiles and trucks.

The primary object is to provide a resilient wheel for the use as specified, which may be constructed in a simple, efficient and durable manner, and thus serve as a substitute for the ordinary rubber tired wheel, or wheels whereon pneumatic tires are employed.

A further object is to provide a resilient wheel, the rim whereof is covered with a plurality of overlapping spring leaves, the interior ends of the leaves being permanently attached to the rim of the wheel, and the outer free end of each leaf being arranged to overlap the body portion of the next adjacent leaf so as to afford a resilient tread for the wheel.

Figure 1:
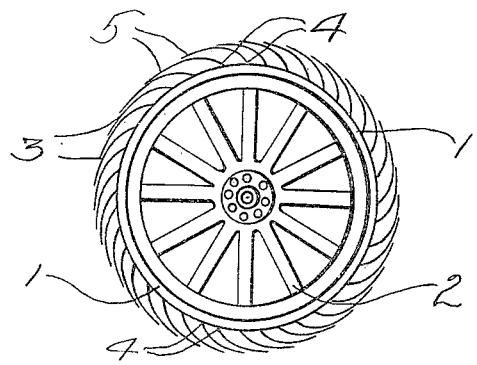
Figure 1 is a side elevation of a wheel equipped with this improvement.
Figure 2:
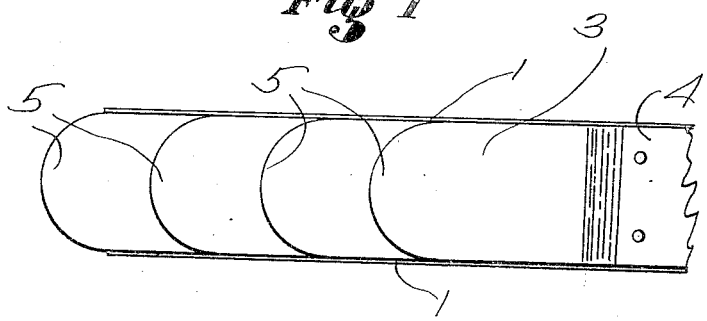
Figure 2 is a plan view.
Figure 3:
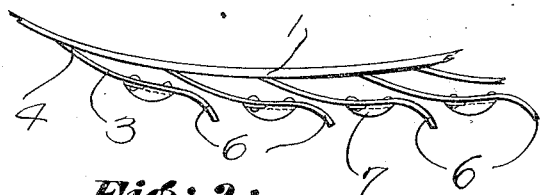
Figure 3 is a view of a modified form of construction showing how the forward ends of the leaves may be bent outwardly and how vertical fins may be secured to the tread of the leaves as a means for preventing skidding.
Figure 4:
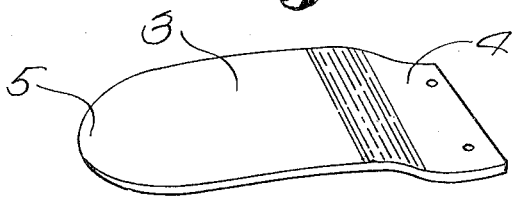
Figure 4 is a detail of one of the leaves.

In the drawing wherein for the purpose of illustration is shown a preferred embodiment of the invention, the numeral 1 designates a rim of a vehicle wheel 2, and to the rim is secured a plurality of resilient leaves or strips 3 having their inner ends 4 secured to the rim in any suitable manner. These leaves are secured to the rim, one in advance of the other, and the body portions of the leaves are curved to overlap the next succeeding leaf so that a resilient tread is provided for the wheel.

The outer free end of each leaf is arranged to overlap the body portion of the next adjacent leaf and is preferably bent outwardly of the rim as at 6 to form road gripping means. In order to prevent the wheel from slipping sidewise, a vertical fin 7 is secured to the intermediate portion of each leaf to extend longitudinally thereof. The fins are fastened to the intermediate portion of the leaves so as not to interfere with flexing movement of the leaves when they are under pressure.

Other variations of course, might be made in the specific structure herein shown, without departing from the spirit of my invention; and while I have herein shown and described a specific manner and method of constructing and assembling the elements of this invention, it is understood that same may be varied in minor details, not departing from the spirit of the invention as laid down in the appended claim.

What I claim to be new and patentable is:

A resilient wheel comprising a rim, a plurality of resilient leaves having their inner ends secured to the rim, and their body portions curved to form a resilient tread portion for the wheel, the outer end of each leaf being arranged to overlap the body portion of the next adjacent leaf and being bent outwardly of the rim to form road gripping means, and a vertically arranged fin secured to the intermediate portion of each leaf and extending longitudinally of the leaf to provide anti-skid means.

DAVID SCOTT ENGLAND.

Witnesses:
LUTHER ENGLAND,
H. E. ELLER.